April 26, 1927.
J. P. FARNHAM
1,626,335
SCAVENGING, FUEL HUMIDIFYING, AND VOLATILIZING PROCESS
AND APPARATUS FOR INTERNAL COMBUSTION ENGINES
Filed April 26, 1923    5 Sheets-Sheet 1
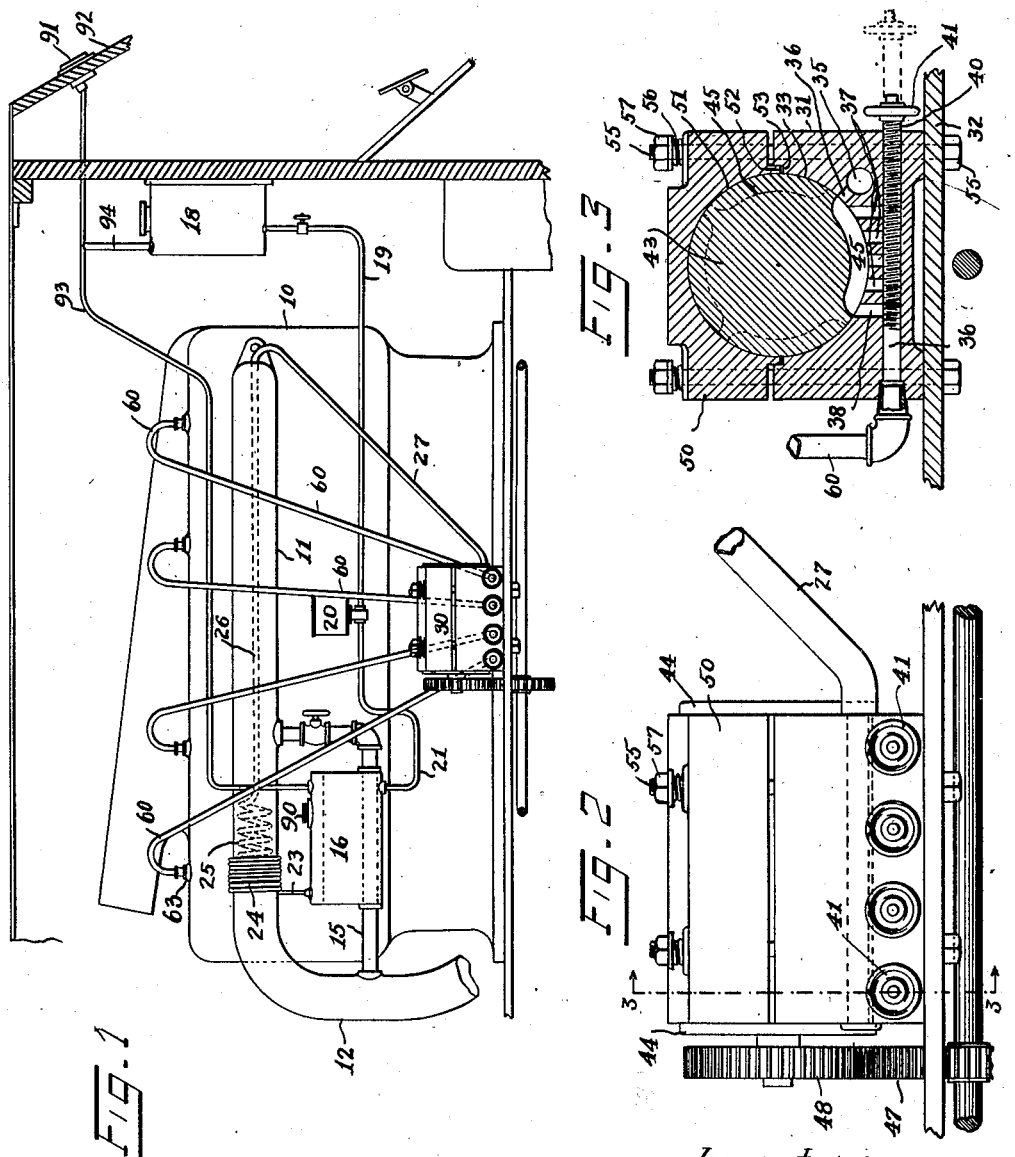
Witnesses:
Inventor:
James P. Farnham
By his atty.

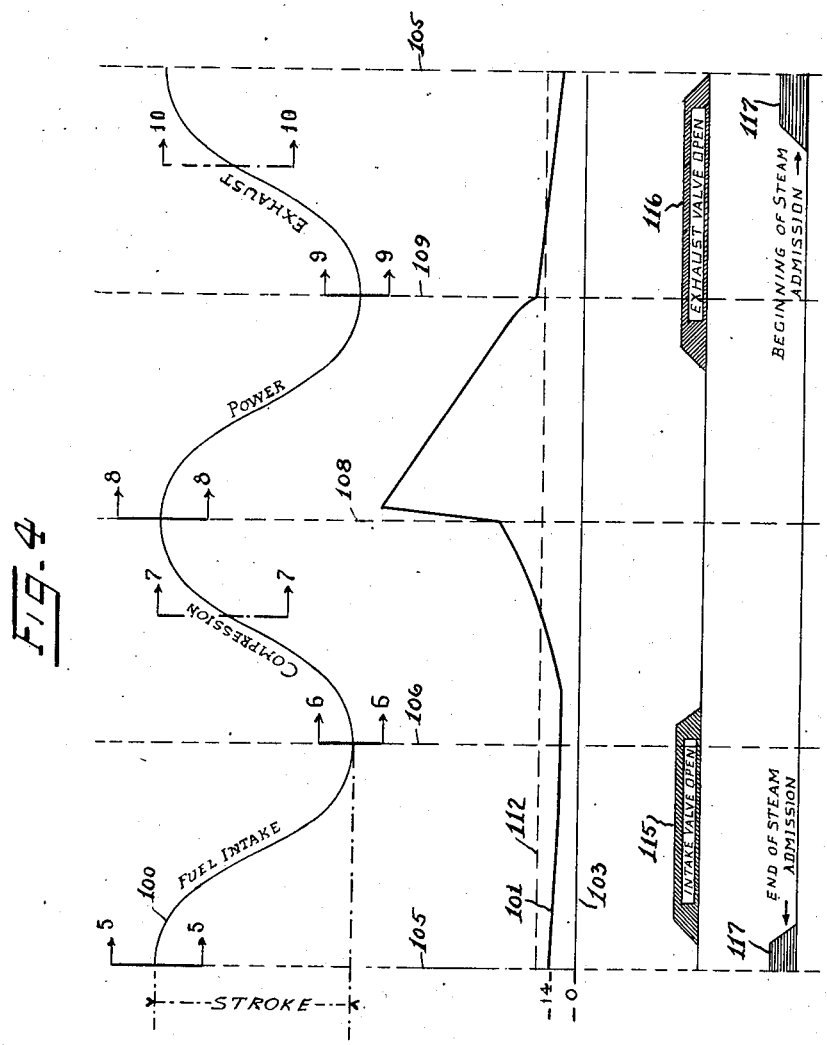

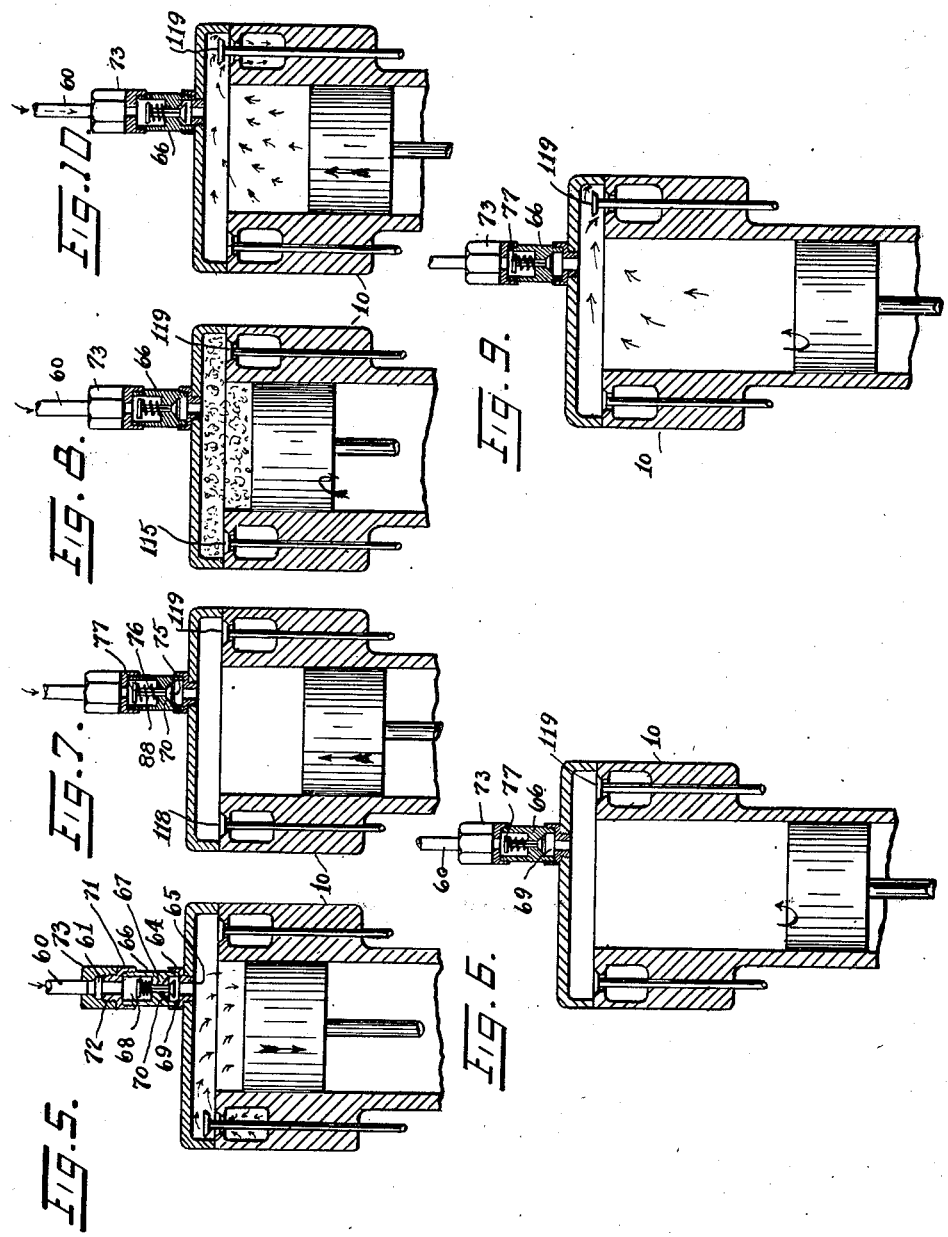

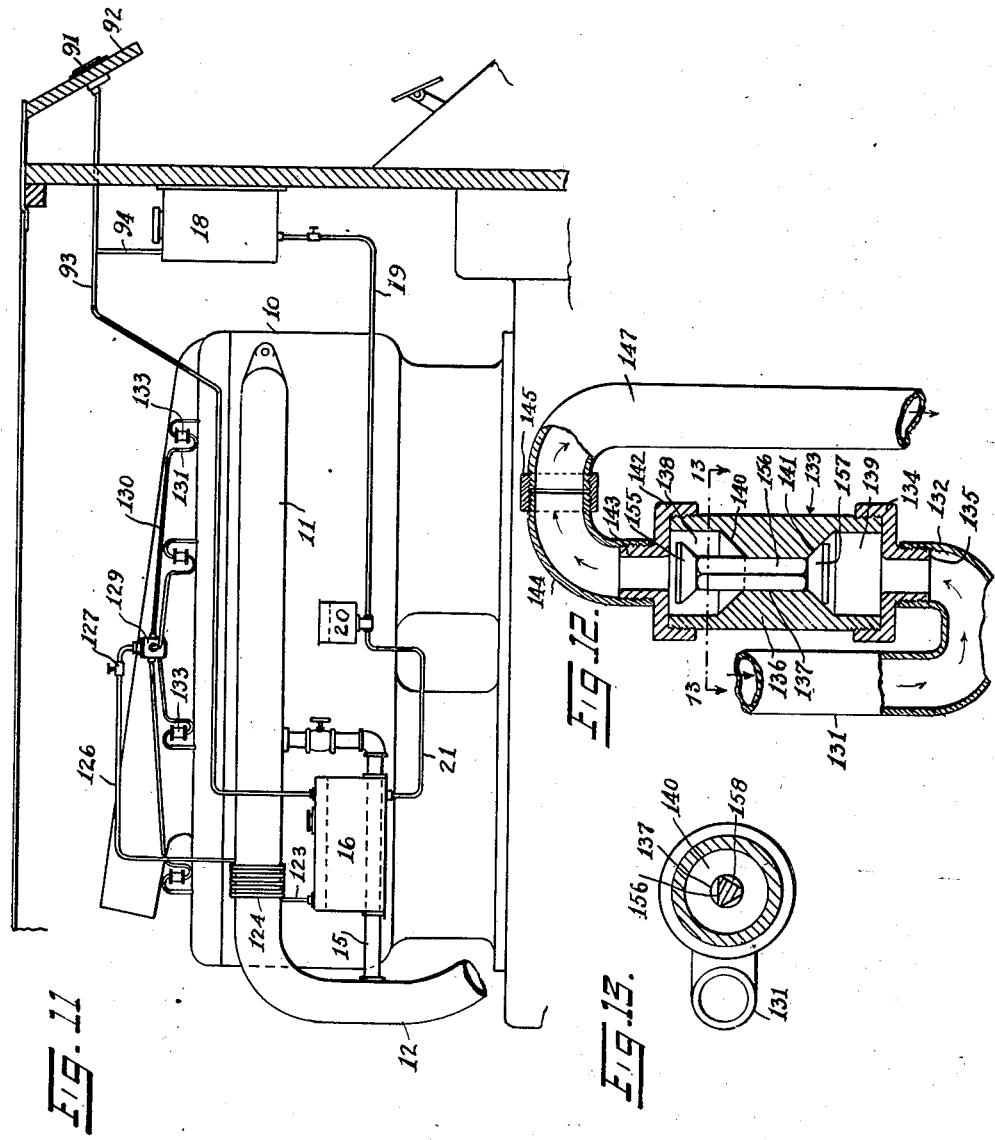

April 26, 1927.
J. P. FARNHAM
1,626,335
SCAVENGING, FUEL HUMIDIFYING, AND VOLATILIZING PROCESS
AND APPARATUS FOR INTERNAL COMBUSTION ENGINES
Filed April 26, 1923
5 Sheets-Sheet 5
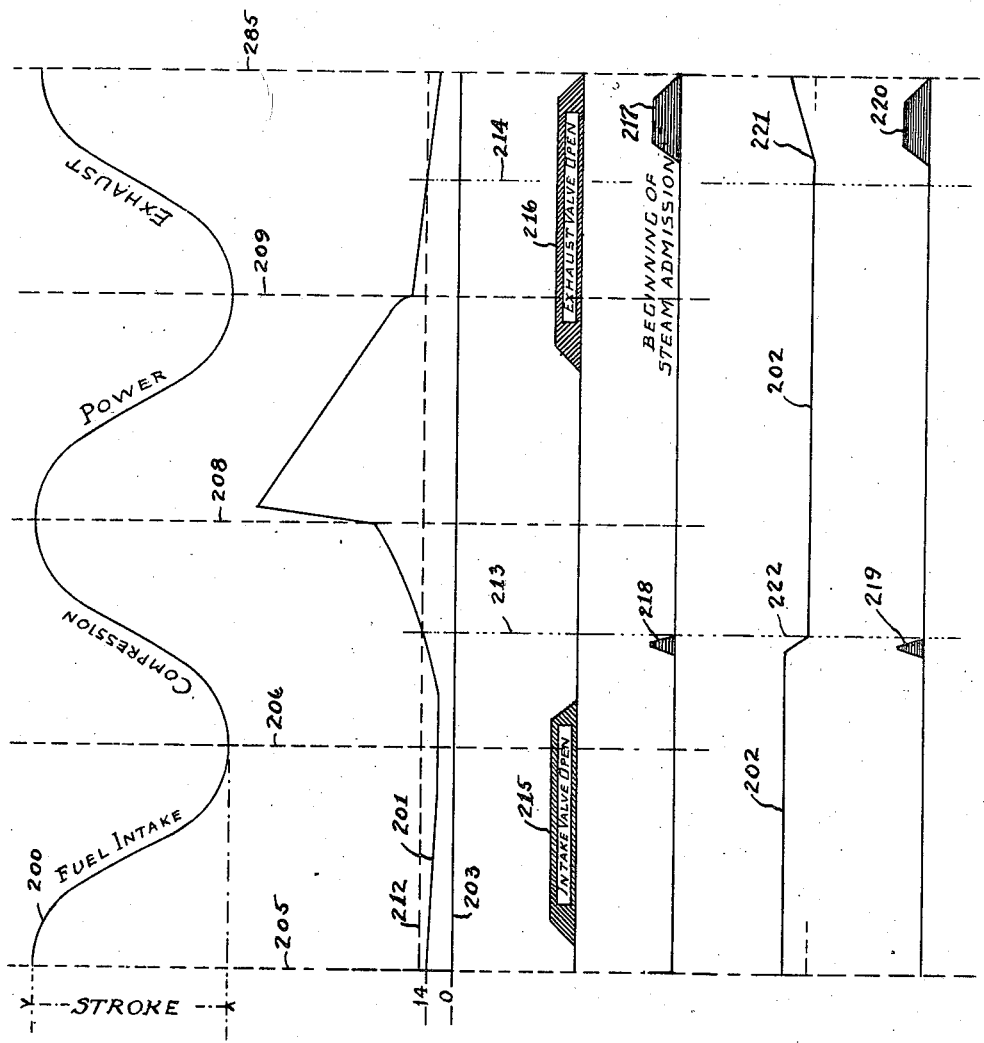

Patented Apr. 26, 1927.

1,626,335

UNITED STATES PATENT OFFICE.

JAMES P. FARNHAM, OF NEW YORK, N. Y.

SCAVENGING, FUEL HUMIDIFYING, AND VOLATILIZING PROCESS AND APPARATUS FOR INTERNAL-COMBUSTION ENGINES.

Application filed April 26, 1923. Serial No. 634,915.

This invention relates to humidifying and scavenging processes and devices for the gases in the cylinders of internal combustion engines, though it is noted that the invention is not limited to humidifiers, nor to scavengers, nor in some respects even to internal combustion engines.

One object of the invention is to provide a process and apparatus or device of this kind by which the exhaust gases are effectively scavenged and the accumulation of carbon reduced.

Another object of the invention is to provide a process and apparatus or device of this kind by which the fuel gases are enriched or volatilized before firing for increasing the thermal and volumetric efficiency of the gases to be exploded, for the purpose of reducing the fuel consumption.

Another object of the invention is to provide various apparatus or devices facilitating processes of the kind stated.

Other objects of the invention are to improve generally the simplicity and efficiency of such process and devices and to provide devices or apparatus of these kinds which are durable, economical to manufacture and operate.

The inventive features for the accomplishment of these and other objects are shown in connection with one or both of two scavenging apparatus one of which, briefly stated, comprises a boiler heated by a shunt pipe passing from a mid part of the exhaust manifold of the engine through the lower part of the boiler and then to the discharge end part of the manifold, whereby water in the boiler is boiled. A steam pipe leading from the boiler to the exhaust manifold, where said steam is superheated, and then to a rotary distributing valve, thence to distributing pipes conducting steam to the heads of the respective cylinders. Said valve is adapted for admitting steam to the respective cylinders at the latter part of the exhaust stroke and beginning of the intake stroke or at other periods of the cycle. Also there are provided check valves establishing communication between the cylinder heads and the distributing pipes respectively to prevent compressed gasses in the cylinder from being forced back into the distributing pipes.

In the other form of the invention, control valves are provided which combine the functions of the above mentioned rotary valve and check valves.

Other objects of the invention will appear as the description proceeds; and while herein details of the invention are described, the invention is not limited to these, since many and various changes may be made without departing from the scope of the invention as claimed.

In the accompanying drawing, showing by way of example, two of many possible embodiments of the invention, Fig. 1 is a side elevation showing one form of the apparatus applied to a multicylinder engine.

Fig. 2 is a fragmental side elevation of the rotary valve.

Fig. 3 is a longitudinal vertical sectional view, partly in elevation, taken on the line 3—3 of Fig. 2, looking in the direction of the arrow of said line.

Fig. 4 is a diagram showing the time relations of the piston position, intake and exhaust valve openings, steam admission and cylinder pressures.

Fig. 5 is a vertical axial sectional view, partly in elevation, showing the valve and piston positions at the time indicated by the line 5—5 of Fig. 4.

Figs. 6 to 10 are vertical sectional views showing the valve and piston positions at the time indicated by the lines 6—6 to 10—10 of Fig. 4.

Fig. 11 is a side elevation showing the other form of the invention applied to a multicylinder engine;

Fig. 12 is a vertical axial sectional view, partly in elevation, showing the control valve;

Fig. 13 shows a section taken on the line 13—13 of Fig. 12 looking in the direction of the arrow of said line; and Fig. 14 is a diagram showing the time relations between piston position, cylinder pressure, steam admission and valve openings.

The apparatus of Figs. 1 to 10 is shown in combination with a multicylinder four-cycle internal combustion engine 10 of an automobile, though the invention is not so limited, said engine having an exhaust manifold 11 extending longitudinally rearwardly of the cylinders, and then downwardly as at 12. A valved shunt heating pipe 15 passing from the mid part of the manifold 11, thence through the lower part of the boiler 16 and then to the downwardly extending part 12 of the manifold, whereby water in the boiler is heated and boiled by the heat from the exhaust gases passing through the shunt pipe.

A reservoir tank 18 supplies water through a valved pipe 19 to a usual form of float chamber 20 which in turn supplies water through a pipe 21 to the lower part of the boiler. This chamber is provided with a float (not shown) for maintaining the water level in the boiler.

A steam pipe 23 leading from the upper point of the boiler is coiled several times around the manifold as at 24, and then extending to the interior of the manifold is there formed into a plurality of heat receiving coils 25, and then extends longitudinally, as at 26, to and through the forward end of the manifold and thence rearwardly and downwardly, as at 27, to a rotary distributing valve 30. Said steam pipe receives heat from the exhaust manifold, thereby to superheat and dry the steam coming from the boiler. The distributing valve 30 comprises a lower block 31 (Fig. 3) bolted to a flange 32 of the engine casing and having an upwardly opening longitudinally disposed semi-cylindrical valve-receiving bearing recess 33. The block 31 is provided with a longitudinal steam receiving passage 35, near the lower part of the outer side of the block, for receiving said steam pipe, and a longitudinal channel 36 or a plurality of radial bores for establishing communication between said passage 35 and said recess 33. A plurality of tapped transverse passages 36 is disposed along the lower part of the block, and a plurality of transverse series of vertical passages 37, 38 establish communication between said transverse passages respectively and the lower part of said recess 33. A threaded valve rod 40 disposed in each of said transverse passages respectively is provided exteriorly with a manipulating wheel 41 and is adapted by longitudinal adjustment therein to establish or disestablish communication between said transverse passage 36 and any number of said vertical passages 37, depending upon how far in or out the rod is adjusted.

A rotary cylindrical valve member 43 is disposed in said recess 33 and at the ends is provided with lateral retaining flanges 44 (Fig. 2) to prevent endwise movement. In its curved face there are a plurality of connecting channels 45 (Fig. 3) corresponding to the respective cylinders of the engine and positioned respectively at equal angles around said valve member. Each channel 45 is registerable with one series only of the respective series of vertical passages 37, 38 and is of such a length that the connecting channel will just bridge and establish communication between the longitudinal channel 36 and the most distant vertical passage 38 of each series. Intermeshing gears 47, 48 (Fig. 2), adjustably secured fast on the cam shaft 49 of the engine and the end of the rotary valve member 43 rotate the latter.

The gear 47 may be rotatably adjusted and fixed at any desired angle on the cam shaft, and said gears and connecting passages are so relatively positioned that the connecting passages establish communication between the steam pipe and the respective distributing pipes and cylinders at the latter part of the exhaust and the beginning of the intake stroke. The adjustment of the gears relative to each other, and the of the threaded rods in their adjustment of the passages permitting variation of both the opening and close the respective distributing pipes.

An upper block 50 (Fig. 3) disposed upon the lower block is provided with a longitudinal downwardly opening semi-cylindrical recess 51 fitting upon said valve member 43 and is provided at the lower edge of the recess 51 with a tongue 52 engaged in a step groove 53 of the lower block to form a steam tight joint therewith. Vertical bolts 55 passing between said passages 36 and through said flange 32 and said blocks 31 and 50 near the side edges thereof hold the distributing valve on the flange. Springs 56 are compressed between the nuts 57 and said upper block 50, whereby the blocks and valve member 43 are held in yieldable steam tight connection, thereby to permit expansion of the parts when they are heated and to compensate for wear.

Distributing pipes 60 (Figs. 1, 3 and 5) extending from the inner ends of said transverse passages to near the upper part of the respective cylinders have enlarged heads 61 at their discharge ends whereby, as will presently appear, are attached check valves 63 communicating with the upper end of the cylinders respectively. Each check valve comprises a lower ferrule 64 (Fig. 5) having a threaded reduced lower end 65 screwed into a tapped opening in the cylinder head, and an upper interiorly threaded recess receiving the lower end of a cylindrical body 66 provided with a large axial bore 67, and enlarged upper and lower chambers 68 and 69, the lower chamber having an upwardly tapering conical valve seat 70 joining said bore 67. An upper ferrule 71 screwed on the upper end of said body is provided with an upwardly pointing exteriorly threaded extension 72, against which the enlarged head 61 of the distributing pipe is clamped by a clamping nut 73 screwed on said reduced end and having an inner shoulder at the upper part engaging said head 61 to hold the head in place.

A vertically movable valve member disposed in said valve body comprises a lower conical head 75 (Fig. 7) adapted when the valve member is raised to close against said seat, an intermediate valve stem 76 of triangular cross section disposed in said axial bore and permitting passage of steam between the walls of said bore and the flat faces of the stem, and a spring retaining head 77 at the upper end of said stem. A spring 88 compressed between said retaining head 77 and the lower wall of the upper chamber 68 yieldably holds said valve head closed on said seat (as in Fig. 7) and permits steam forced from the distributing pipes 60 to force open the valve (as in Fig. 5) and to pass into the cylinder. Obviously the valves are normally closed and prevent compressed gases in the cylinders from being forced back into the distributing pipes 60.

A safety valve 90 (Fig. 1) is disposed on the upper part of the boiler to prevent too high a pressure therein. A pressure gauge 91 mounted on the instrument board 92 of the automobile is connected by a pressure pipe 93 with the upper part of the boiler, whereby the pressure of the steam in the boiler may be read by the driver; and an equalizing pipe 94 between said pressure pipe and the upper part of the reservoir 18 equalize the pressure between the upper part of the reservoir and the upper part of the boiler, thereby to prevent the pressure of the steam in the boiler from forcing the water from the boiler back into the reservoir.

The operation of the apparatus of Figs. 1 to 3 is simple and obvious and is explained below in connection with the diagram of Fig. 4 showing one complete cycle of a four cycle engine piston, the two upper curved lines 100 and 101 representing piston positions and cylinder pressure respectively, while the horizontal line 103 represents absolute zero pressure. The vertical dotted lines 105, 106, 108 and 109 represents the instants at the ends of the exhaust stroke, intake stroke, compression stroke and power stroke.

Steam pressure in the boiler is maintained above atmospheric pressure and is represented by the line 112, and is sufficiently high to be greater than the interior cylinder pressure 101 whenever steam is to be admitted.

The shaded areas 115 and 116 respectively represent the duration of the intake and exhaust opening. The area 117 represents the steam admission.

During the close of the compression stroke (Fig. 7 and line 7—7 of Fig. 4) the rotary valve 30, the check valve 63, the intake valve 118 and the exhaust valve 119 are all closed, which condition continues to the end of the compression stroke (Fig. 8 and line 8—8), whereupon ignition and explosion take place, the cylinder pressure goes up and the power stroke commences. Toward the close of the power stroke, the exhaust valve opens (Fig. 9) as shown by the intersection of the area 116 and the line 109. This condition continues (Fig. 10) until near the close of the exhaust stroke whereupon the connecting passage 45 (Fig. 3) bridges and establishes communication between the passage 35 and the nearest open vertical passage 38, whereby steam is admitted under boiler pressure into the exhausting cylinder, as indicated by the left hand end of the shaded area 117, thus displacing the exhaust gases and thoroughly scavenging the cylinder before the commencement of intake.

At the close of the exhaust stroke, indicated by line 105 and Fig. 5, the exhaust closes, as indicated by the right hand end of the area 116, the rotary valve still being open for a while at the commencement of the intake stroke to admit steam into the cylinder during suction, for humidifying, volatilizing and increasing the efficiency of the fuel mixture. As shown, the steam admission may continue until the fuel intake commences, as shown by the overlapping of the areas 117 and 115. When the rear end of the connecting passage 45 reaches and passes the position of Fig. 3, steam admission ceases, as shown by the right hand end of the area 117. As is usual, the intake is open a short while at the beginning of the compression stroke (Fig. 6), as shown by the intersection of the area 115 with the line 106. During the compression stroke the intake valve closes and the cylinder pressure increases until the condition of Fig. 7 is reached.

In Figs. 11 to 13, I show a device in which the functions of the distributing and the check valves are combined in a single valve actuated by the co-action of the steam and gas pressures without any mechanical connection with the moving parts of the engine. This device is shown, as in Fig. 1, in connection with a multi-cylinder internal combustion engine 10 having an exhaust manifold 11 with down-turned end 12. The shunt pipe 15, boiler 16, a reservoir tank 18 and a float chamber 20 are as in Fig. 1; but the steam pipe 123 leading from the upper part of the boiler and around the manifold, as at 124, whereby said steam is superheated, passes upwardly, and then horizontally, as at 126, through the valve 127 to a vertically disposed cylindrical distributing head 129 receiving the steam pipe through its top wall. The distributing pipes 130 extending from the side walls of the distributing head are downwardly turned as at 131 and provided with upwardly turned interiorly threaded ends 132 (Fig. 12) disposed above the heads of the respective cylinders.

Control valves 133 are disposed between the upper ends of the cylinders respectively and the discharge ends of the dstributing pipes 130 at times permitting steam to be forced from the distributing pipes into the cylinder and preventing compressed gases in the cylinder from being forced back into the distributing pipes, as will be explained. Each control valve comprises a lower ferrule 134 (Fig. 12) having a threaded reduced lower end 135 screwed into one of said interiorly threaded ends 132. A cylindrical body 136 is screwed into the upper part of said ferrule and provided with a large axial bore 137 (Fig. 13) and enlarged upper and lower chambers 138 and 139 (Fig. 12), the chambers having conical valve seats 140 and 141 tapering toward and joining said bore. An upper cap 142 screwed on the upper end of said body 136 is provided with an upwardly pointing exteriorly threaded extension 143 receiving an interiorly threaded elbow pipe 144 and joined by means of a threaded collar 145 to a connecting pipe 147 screwed into a tapped opening in the head of the adjacent cylinder and abutting the end of said elbow.

A vertically movable valve member disposed in said valve body comprises upper and lower conical heads 155 and 157 adapted respectively when the valve member is lowered or raised to close against the seats 140 and 141. Said heads are connected by an intermediate valve stem 156 of triangular cross section (Fig. 13) disposed in said axial bore and permitting passage of steam between the walls of said bore and the flat faces 158 of the stem.

The operation of the device of Figs. 11 to 13 is explained below in connection with the diagram of Fig. 14 showing one complete cycle of an engine piston, the two upper curved lines 200 and 201 and the next to the bottom line 202 representing piston position, cylinder pressure and control valve position respectively; while the horizontal solid line 203 represents absolute zero pressure. The vertical dotted lines 205, 206, 208 and 209 represent the instants at the end of the exhaust stroke, intake stroke, compression stroke and power stroke.

Steam pressure in the boiler is maintained at about 17 pounds above absolute zero and is represented by the line 212 and is sufficiently high to be at times equal to the interior cylinder pressure 201, as shown at the intersections of the lines 201 and 212 as indicated by the vertical lines 213 and 214.

The shaded areas 215 and 216 respectively represent the duration of the intake and exhaust opening. The areas 217 and 218 represent the steam admission; while the lowest areas 219 and 220 represent control valve openings.

At the latter part of the compression stroke the valve head 155 (Fig. 12) has been lowered (line 202) and the cylinder pressure 201 is greater than the steam pressure 212 so that pressure above valve head 155 is greater than that below it, and the control valve is held closed and lowered, as indicated by the line 202. At this time the intake valve 118 and the exhaust valve 119 are also in closed position, which condition continues to the end of the compression stroke (line 208) whereupon ignition and explosion take place, the pressure (line 201) goes up and the power stroke commences. Toward the close of the power stroke, the exhaust valve opens as shown by the intersection of the area 216 and the line 209. This condition continues until the cylinder pressure becomes so low that the exhaust gas pressure on the head 155 and the weight of the valve member become less than the steam pressure, whereupon the head 155 rises, as shown by the upward slant 221 of the line 2—2, thus opening the valve 133 as indicated by the area 220, establishing communication between the steam pipe 130 and the cylinder, whereby steam is admitted under boiler pressure into the exhausting cylinder, as indicated by the shaded area 217, thus displacing the exhaust gases and thoroughly scavenging the cylinder before the commencement of intake.

At the close of the exhaust stroke, indicated by line 205, the exhaust valve closes, as indicated by the right hand end of the area 216 and by this time the head 155 has risen until the head 157 closes on the seat 141 (Fig. 12) closing the valve, as shown by the right hand end of area 220 and steam admission ceases, as shown by the right hand end of the area 217. The intake opens a short while after the beginning of the intake stroke (line 205), as shown by the left hand end of the area 215. During the intake stroke the cylinder pressure at first decreases and then rises until the cylinder pressure 201 equals the steam pressure 212 as shown by the intersection of lines 201 and 212 at line 213.

Just before this instant (line 213) is reached, the weight of the valve member and the cylinder pressure together become greater than the steam pressure, and the valve member falls as shown by the abrupt slant 222 of the line 202, and the valve 133 opens for an instant as shown by the area 219. As the cylinder pressure is here so nearly equal to the steam pressure, the amount of steam admission is very small, as shown by the small area 218.

Wherever an engine cylinder is claimed herein, it is understood that the term is broad enough to cover any equivalent device.
I claim as my invention:

1. In combination, a multicylinder internal combustion engine having an exhaust manifold extending longitudinally rearwardly of the cylinders and then downwardly; a boiler beneath the manifold; a valved shunt heating pipe passing from the mid part of the manifold, thence through the lower part of the boiler and then to the downwardly bent part of the manifold, whereby water in the boiler is heated and boiled by the heat from the exhaust gases passing through the shunt pipe; a raised reservoir tank for supplying water to the boiler; a distributing valve receiving the steam from the boiler; and distributing pipes conducting steam from the distributing valve to the cylinders.

2. In combination, a multicylinder internal combustion engine having fuel feed means and an exhaust manifold; a boiler; a steam pipe leading from the upper point of the boiler and coiled several times around the manifold and then extending to the interior of the manifold and there formed into a plurality of heat receiving coils and then extending to and through the forward end of the manifold and thence rearwardly and downwardly to near the exhaust valve of the engine whereby said steam pipe receives heat from the exhaust manifold, thereby to superheat and dry the steam coming from the boiler; a distributing valve receiving the steam from the boiler; and distributing pipes separate from the fuel feed means for conducting steam from the distributing valve to the cylinders.

3. In combination, an internal combustion engine having an exhaust manifold; a boiler; a distributing valve comprising a block having a semi-cylindrical recess; a longitudinal steam receiving passage near one side of the block in communication with said recess, a plurality of transverse distributing passages communicating with the recess; a rotary cylindrical valve member disposed in said recess and provided with a plurality of connecting channels positioned respectively at different distances around said valve member adapted to connect said receiving passages with said respective transverse passages; a steam pipe leading from the boiler to the receiving pipe; and distributing pipes conducting steam from the transverse passages to the heads of the cylinder.

4. In combination, a multi-cylinder internal combustion engine; means for introducing fuel into the cylinders; a single steam supply pipe; a rotary distributing valve receiving steam from said single steam supply pipe; distributing pipes conducting steam from the distributing valve to the heads of the cylinder separately from said fuel; said valve admitting steam to the respective cylinders at the latter part of the exhaust stroke and beginning of the intake stroke and holding the steam against admission during the latter part of the intake stroke and the beginning of the exhaust stroke.

5. The combination with an internal combustion engine, of means for generating steam, and means cooperating between the steam generating means and the engine cylinder for supplying steam to the cylinder during the latter part of the exhaust stroke and the first part of the intake stroke of the cylinder piston and withholding steam from the cylinder during the latter part of the intake stroke and the first part of the exhaust stroke.

6. The combination with an internal combustion engine, of means for generating steam, and means cooperating between the steam generating means and the engine cylinder and successively operated by pressure of steam from said generating means and by pressure in the cylinder for supplying steam to the cylinder during the latter part of the exhaust stroke and the first part of the intake stroke of the cylinder piston and withholding steam from the cylinder during the latter part of the intake stroke and the first part of the exhaust stroke.

7. The combination with a multiple cylinder internal combustion engine, of means for generating steam, means for supplying fuel to the combustion chamber of each of the engine cylinders, and means independent of said fuel supplying means and cooperating between the steam generating means and the combustion chamber of each of the cylinders for supplying steam to said chamber during the latter part of the exhaust stroke and the first part of the intake stroke of the cylinder piston and withholding steam from said chamber during the latter part of the intake stroke and the first part of the exhaust stroke.

8. The combination with a multiple cylinder engine, of means for generating steam, means for supplying fuel to the combustion chamber of each of the engine cylinders, and means independent of said fuel supplying means and cooperating between the steam generating means and the combustion chamber of each of the cylinders and successively operated by pressure of steam from said generating means and by pressure in the chamber for supplying steam to said chamber during the latter part of the exhaust stroke and the first part of the intake stroke of the cylinder piston and withholding steam from said chamber during the latter part of the intake stroke and the first part of the exhaust stroke.

9. The combination with a multiple cylinder internal combustion engine, of steam generating means, pipes for distributing steam from said generating means, and means cooperating between said pipes and the engine cylinders for supplying steam from said pipes to the cylinders during the latter part of the exhaust stroke and the first part of the intake stroke of the cylinder pistons and withholding steam from the cylinders during the latter part of the intake stroke and the first part of the exhaust stroke and preventing passage of gas from the cylinders into said pipes.

10. The combination with a multiple cylinder internal combustion engine, of steam generating means, pipes for distributing steam from said generating means, and an automatically operating control valve cooperating between each of said pipes and each of the engine cylinders for supplying steam from the pipe to the cylinder during the latter part of the exhaust stroke and the first part of the intake stroke of the cylinder piston and withholding steam from the cylinder during the latter part of the intake stroke and the first part of the exhaust stroke and preventing passage from the cylinder into the pipe, of gas compressed in the cylinder.

11. The process of scavenging, fuel-humidifying and volatilizing which consists in introducing into the cylinder of an internal combustion engine steam of greater pressure than the compression of the piston during the latter part of the exhaust stroke and the first part of the intake stroke and reducing the pressure of the steam introduced into the cylinder so that it is less than the compression of the piston during the latter part of the intake stroke and the first part of the exhaust stroke and is thereby withheld from the cylinder.

12. In combination with a multiple cylinder internal combustion engine, means for generating steam spaced away from the engine and heated by the engine exhaust, and valve means operatively connected to the steam generating means and adapted and operatively connected for supplying steam to each cylinder during the latter part of the exhaust stroke and beginning of the intake stroke and withholding supply of the steam therefrom during the latter part of the intake stroke and beginning of the exhaust stroke of the cylinder piston.

13. In combination with a multiple cylinder internal combustion engine, means for generating steam spaced away from the engine and heated by the engine exhaust, and valve means spaced away from the engine and operatively connected to the steam generating means and adapted and operatively connected for supplying steam to the interior of the head of each cylinder during the latter part of the exhaust stroke and beginning of the intake stroke and withholding supply of the steam therefrom during the latter part of the intake stroke and beginning of the exhaust stroke of the cylinder piston.

14. In combination with a multiple cylinder internal combustion engine, means for generating steam spaced away from the engine and heated by the engine exhaust, valve means adapted for supplying steam to each cylinder during the latter part of the exhaust stroke and beginning of the intake stroke and withholding supply of the steam therefrom during the latter part of the intake stroke and beginning of the exhaust stroke of the cylinder piston, means for conveying steam from the generating means to said valve means, and means cooperating between said valve means and the head of each cylinder for conveying the steam from said valve means to the cylinder free from passage through the fuel intake means of the engine.

15. In combination with a multiple cylinder internal combustion engine, means for generating steam spaced away from the engine and heated by the engine exhaust, valve means adapted for supplying steam to each cylinder during the latter part of the exhaust stroke and beginning of the intake stroke and withholding the supply of the steam therefrom during the latter part of the intake stroke and beginning of the exhaust stroke of the cylinder piston, means for conveying steam from the generating means to said valve means and superheating the steam by heat from the engine exhaust during conveyance, and means cooperating between said valve means and the head of each cylinder for conveying the steam from said valve means to the cylinder free from passage through the fuel intake means of the engine.

16. The process of scavenging, fuel-humidifying and volatilizing which consists in supplying fuel to the combustion chamber of each of the cylinders of a multiple cylinder internal combustion engine, and supplying steam to the combustion chamber during the latter part of the exhaust stroke and beginning of the intake stroke and withholding the supply of steam therefrom during the latter part of the intake stroke and beginning of the exhaust stroke of the cylinder piston, said steam being generated prior to admission to the cylinder.

17. The process of scavenging, fuel-humidifying and volatilizing which consists in supplying fuel to the combustion chamber of each of the cylinders of a multiple cylinder internal combustion engine, and supplying steam to the combustion chamber during the latter part of the exhaust stroke and beginning of the intake stroke and withholding the supply of steam therefrom during the latter part of the intake stroke and beginning of the exhaust stroke of the cylinder piston, said steam being generated prior to admission to the cylinder, and being free from passage through the fuel intake means of the engine.

18. The process of scavenging, fuel-humidifying and volatilizing which consists in supplying fuel to the combustion chamber of each of the cylinders of a multiple cylinder internal combustion engine, and supplying steam to the combustion chamber during the latter part of the exhaust stroke and beginning of the intake stroke and withholding the supply of steam therefrom during the latter part of the intake stroke and beginning of the exhaust stroke of the cylinder piston, said steam being generated and superheated prior to admission to the cylinder.

JAMES P. FARNHAM.